(No Model.) 4 Sheets—Sheet 1.

W. H. HARRELSON.
WIRE RIPRAP AND JETTY WORK.

No. 426,807. Patented Apr. 29, 1890.

Witnesses
Geo. J. Thorpe
G. A. Taubenschmitt

Inventor
Wm. H. Harrelson.
By his Attorneys
Higdon & Higdon.

THE NORRIS PETERS CO., PHOTO-LITHO., WASHINGTON, D. C.

(No Model.) 4 Sheets—Sheet 2.
W. H. HARRELSON.
WIRE RIPRAP AND JETTY WORK.
No. 426,807. Patented Apr. 29, 1890.
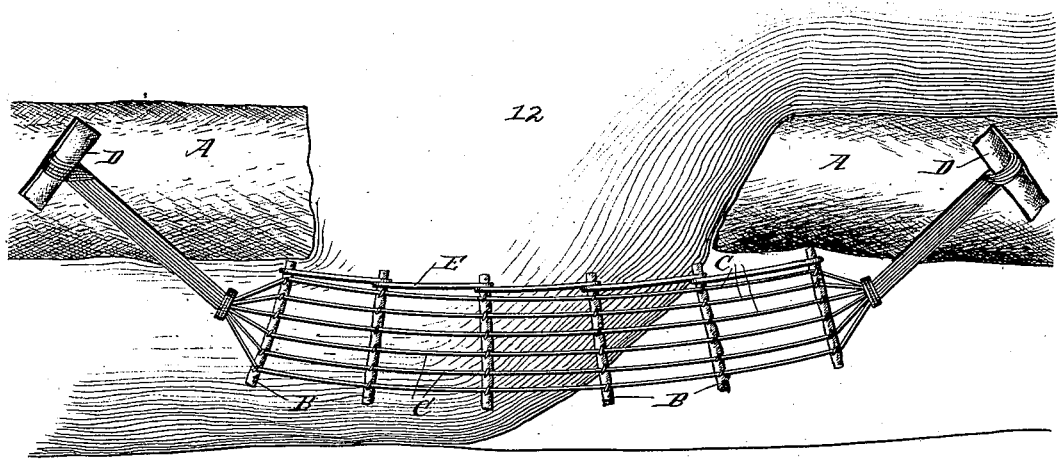
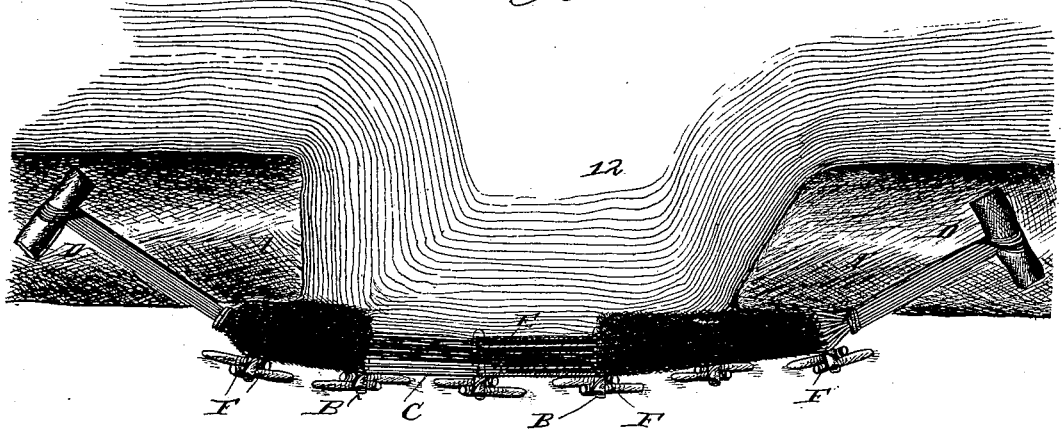
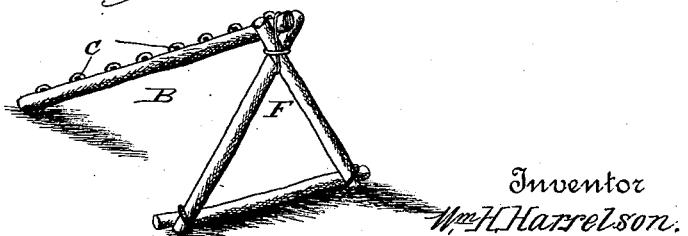
Witnesses
Geo. J. Thorpe
G. A. Taubelschmidt
Inventor
Wm. H. Harrelson
By his Attorneys
Higdon & Higdon

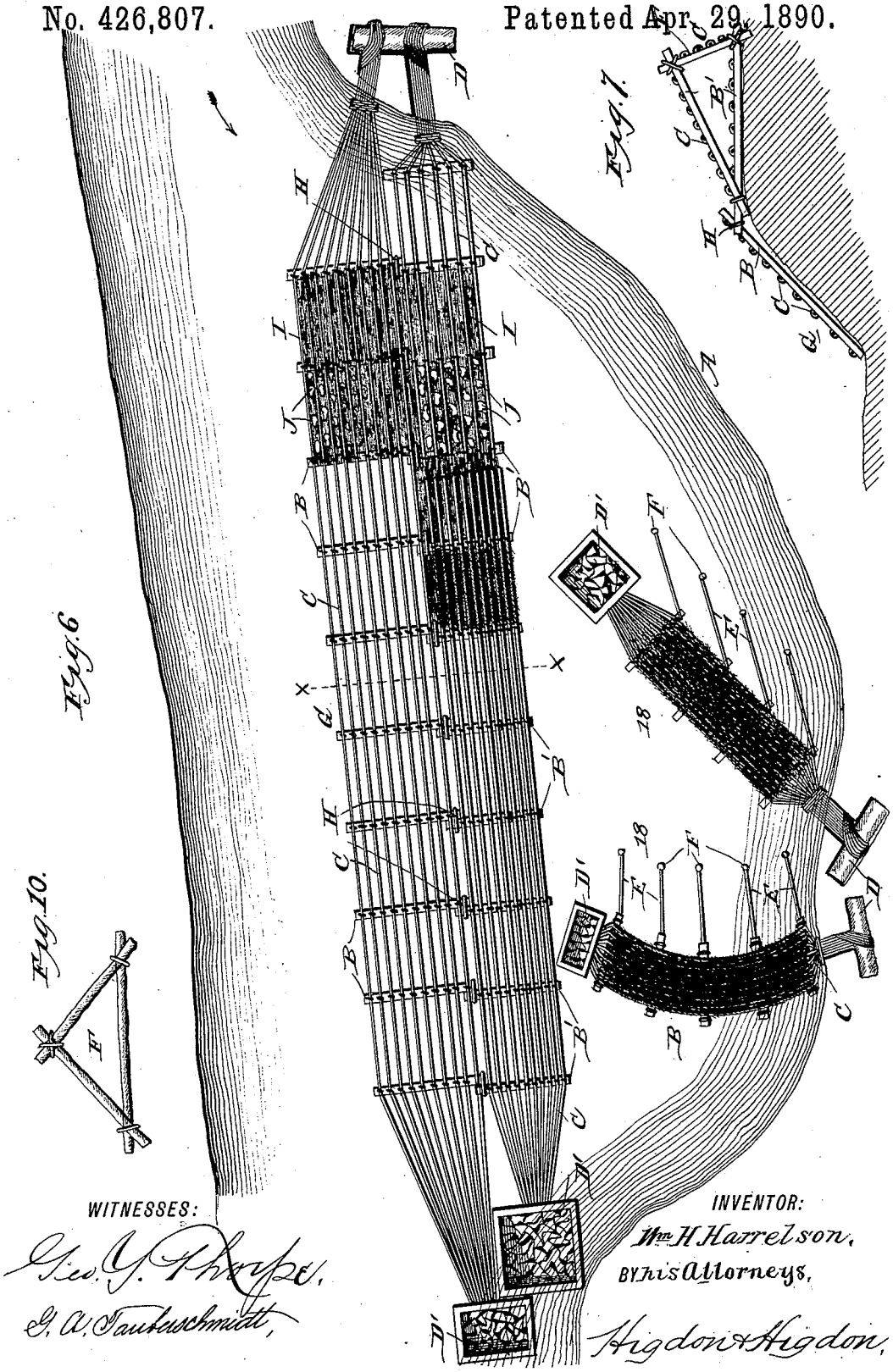

(No Model.) 4 Sheets—Sheet 4.

W. H. HARRELSON.
WIRE RIPRAP AND JETTY WORK.

No. 426,807. Patented Apr. 29, 1890.

Witnesses:

Inventor:
Wm. H. Harrelson.
By his Attorneys,
Higdon & Higdon.

UNITED STATES PATENT OFFICE.

WILLIAM H. HARRELSON, OF KANSAS CITY, MISSOURI.

WIRE RIPRAP AND JETTY WORK.

SPECIFICATION forming part of Letters Patent No. 426,807, dated April 29, 1890.

Application filed March 25, 1890. Serial No. 345,290. (No model.)

*To all whom it may concern:*

Be it known that I, WILLIAM H. HARRELSON, of Kansas City, Jackson county, Missouri, have invented certain new and useful Improvements in Wire Riprap and Jetty Work, of which the following is a full, clear, and exact description, reference being had to the accompanying drawings, forming a part hereof.

My invention relates to riprap and jetty work; and it consists in the novel construction, combination, and arrangement of devices hereinafter set forth.

Figure 1:
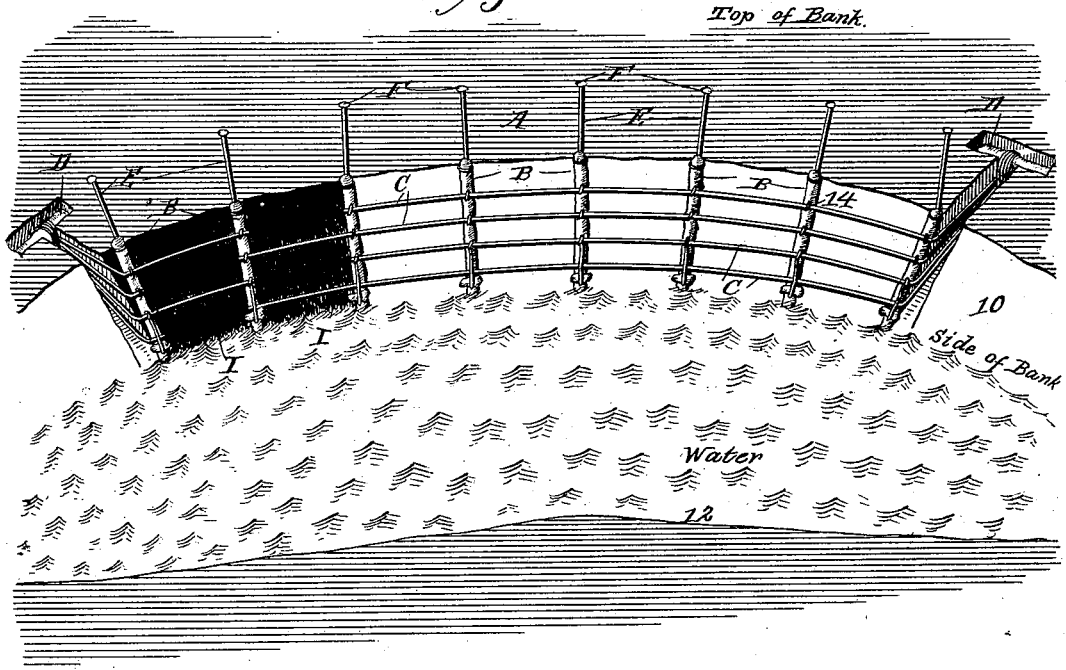
Figure 2:
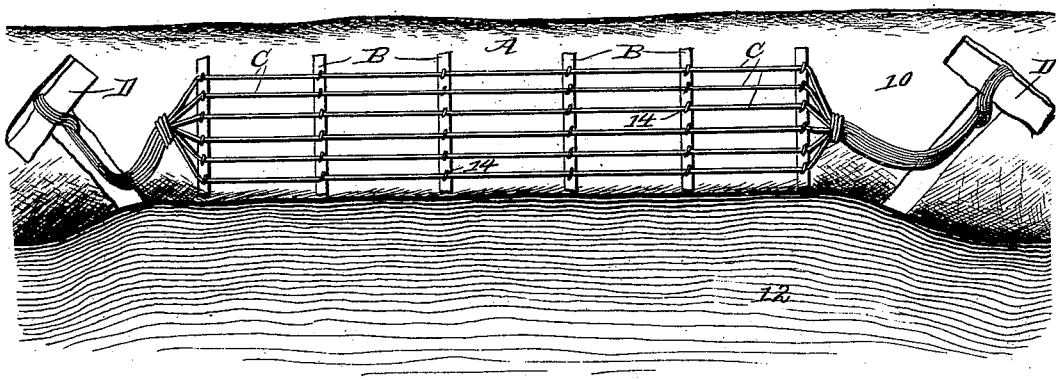
Figure 8:
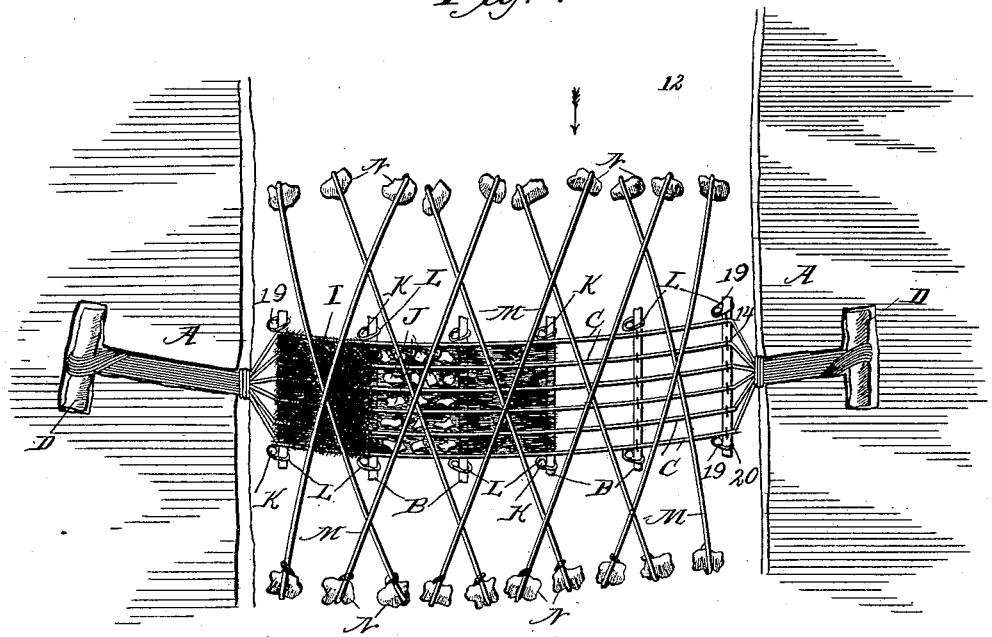
Figure 9:
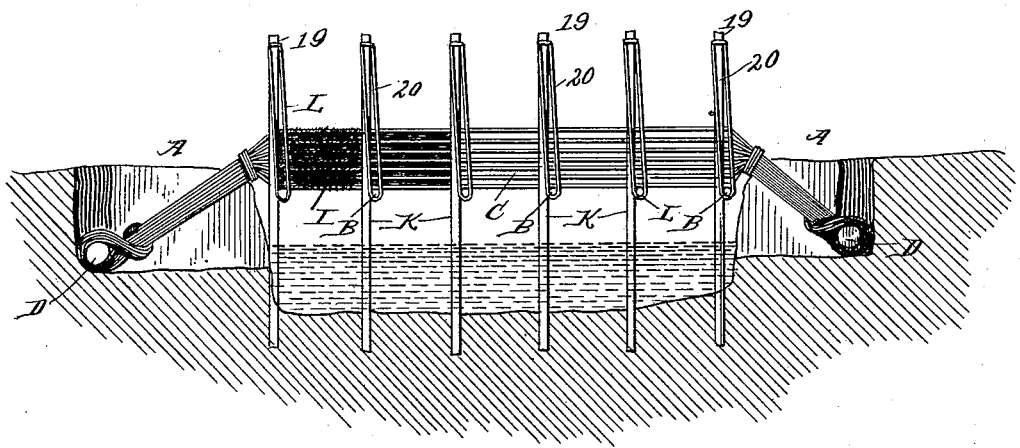

In the drawings, Figure 1 is a plan view showing my invention applied to a river-bank. Fig. 2 is a side elevation of same with protector ready to be submerged. Fig. 3 is a plan view of same, illustrating the manner in which my protector is used to obstruct the water when it has broken through a levee. Fig. 4 is a similar view showing the protector in a modified form and in proper position after it has been completed. Fig. 5 is a detail view illustrating the manner in which the supporting-timbers are arranged. Fig. 6 is a plan view of a long span or reach and showing my protector and jetty-work. Fig. 7 is a transverse section through Fig. 6 on line $x$ $x$ before a washout occurred. Fig. 8 is a plan view showing my jetty-work constructed across a stream with the anchorage firmly planted at each side thereof. Fig. 9 is a vertical section of Fig. 8, showing the work before it is submerged. Fig. 10 is a detail view of a triform frame made use of.

A indicates the top of the river-bank in Fig. 1, and the protector is composed of a number of timbers B, laid down on the side 10 of said bank parallel with each other a suitable distance apart, the lower ends thereof resting at the foot of the embankment and having their upper ends properly secured and lashed with wires E to pickets F, driven at a suitable distance back from the edge of the bank. In this figure I have shown one short section of my river-bank protector firmly anchored by means of anchors D at each end along the river-bank. This protector, it will be noticed, is composed of a series of parallel timbers B and a series of longitudinally-extending wires C, which are secured to said timbers wherever contact is made by means of staples 14, and the ends of said longitudinal wires are extended over to the bank and lashed around said anchors D.

Before proceeding further I will state that the object of my invention is to provide an improved system of riprap and jetty work composed of wire mainly, which may be successfully applied to rivers and streams of any size to prevent the washing away of banks or the breaking of levees, or it can be equally well applied in forming bars across bends in rivers and for placing in certain positions, causing the stream or river to deepen its channel or change its course, as the case may be. It may also be used profitably in harbor-work, in throwing up bars, filling in where land has been washed away. It may also be used with the same effect to protect the sides and bottoms of open ditches and drops in ditches, where it is necessary to confine a volume of rapidly-moving water in a narrow space, by putting in light frame-work composed mainly of wires C, as illustrated in Fig. 10.

In the drawings I have shown a number of modifications in which my system may be so constructed as to prevent the washing away of the soil and to fill up all breaks in levees or the banks of streams.

It will be observed that my system comprehends the use of ordinary metallic wire in particular, which may be smooth, but is preferably barbed, and it may be either plain or galvanized, and that I make use of metallic staples and nails of different kinds for securing said wire in place upon the timbers. It will be seen that I begin work (see Fig. 1) by fastening the wires C to said anchors D and stretching them at any suitable distance apart over the timbers B, driving suitable staples 14 over said wires where they cross each timber until I get to the opposite end. When I have stretched a suitable number of wires, I then take undergrowth of timber or brush—such as I—and plait them over and under the wires C until I form a suitable mattress on the wires and between the several timbers, which construction will effectually break the current of the stream when the freshet comes, causing the sand and washing earth to fill in under and in the rear of the net-work of brush and wire, thereby completely filling up the break or the washed-out embankment. In some instances, as shown in Figs. 5, 6, 7, and 10, I prop the timbers B at their upper ends by means of a suitable triform rack or frame F, and in then throwing in any loose material—such as straw, brush, and stones—filling the space between the protector and the bank. When it is necessary, I lash a heavy stone N to the lower ends of each of the timbers B, which effectually holds them to the bottom of the stream, and in case the sand should wash from under where they were first located, their weight will automatically force them downward, thus automatically closing the breach under the protector as fast as it is made. (See Fig. 8.)

In Fig. 2 I show the manner in which my improved protector may be constructed on dry land where the embankment is just beginning to wash away. After it has been constructed as before mentioned and firmly woven together and the mattresses completed, each end being firmly lashed to the anchors D, it is then to be shoved over the embankment down into the water, remaining in an inclined position, thus preventing further washing and cutting of the embankment.

In Fig. 3 I show the manner in which my combined protector and jetty or riprapping may be successfully applied to obstruct the water where it has broken through a levee. In this view it will be seen that the water has broken through the levee, the cut being indicated by the numeral 12. To apply my improvement in this case, I first proceed as above stated, and then raise the ends of the timbers B, as seen in Fig. 5, and weight the other end, as before stated. In Fig. 4 this break in the levee has been substantially stopped, and as the swift current through the break has ceased to flow the minor filling process with earth and brush can now be performed with rapidity and ease. The wires C, particularly if barbed, will catch all floating grass, hay, straw, &c., and effectually help to make the protector water-tight.

In Fig. 6 I show a long span or reach of my combined protector and jetty. G indicates the front or apron part, to the upper end of which is hinged or lashed an upper or back section B', the hinges or fastening devices being indicated by the letter H, the construction of this upper section being substantially the same as the lower section or apron, except that stone-boxes D' are made use of as anchors at one end of the work. I then work in a suitable quantity of brush, also as before stated, and place sufficient weight—such as stones J—in among the mattresses to sink them and hold the work in place as the sand is washed from under. I then stretch an additional series of wires, as many as may be necessary, proceeding, as before, until the work attains the desired width and thickness. This construction forms an effective jetty, the front or apron part G sinking down to the required depth as the sand is washed from beneath it, the whole forming a very complete riprap from the bottom up, while the back section is automatically forming a bar behind. 18 represents similar jetty-work for the purpose of filling in the washed-out space behind the main work, the construction being clearly shown, and the same is built at any angle or curve and should be weighted with just sufficient stone to prevent floating. It will thus be seen that my improvement can be easily constructed in a large bend of a stream where the land has been washed away, and by its use the cut or wash may be easily filled up and the land restored.

In Fig. 8 is shown my jetty-work constructed across a stream, with the anchorages firmly planted at each side thereof, the construction being similar to that before described. The purpose of this is to form a dam across a stream having quicksand bottom, preparatory to turning the water into irrigation-ditches or raising it a few feet for any other purpose. In constructing this dam I first plant my anchors D in the banks of the stream opposite each other, and then place across the stream two rows of temporary piles 19, and then lash strong cords or wire cables 20 around the tops of same, which cords or cables are extended down a suitable distance below the top and are looped around the ends K of the parallel timbers B, the letter L indicating the loops. When the parallel timbers B are thus placed in position, I stretch my wires C, as before stated, making them fast to the cross-timbers by means of staples 14. I then commence plaiting in brush and undergrowth, building one tier above the other, at the same time placing in a sufficient weight of stone or gravel to force the mattresses to the bottom of the stream. When my mattresses are thus completed, I then cut the cords 20 and let said mattresses drop to the bottom of the stream and cut off the piles 19 below the water, thus completing the dam. In order to hold these mattresses more firmly upon the bottom of the stream, I take long wires M and stretch them across said mattresses in a direction parallel to the banks of the stream and lash a heavy weight of stone N to each end of said wires, which binds said mattresses firmly into place, and the washings of the stream—such as mud, sand, &c.—then wash in above the mattresses, making it comparatively water-tight, and the water will rise above the dam until it passes over, said mattresses thus being lightly secured in place without being weighted so heavily as to force them below the quicksand bottom.

Having thus described my invention, what I claim is—

1. The improved riprap and jetty construction, substantially as hereinbefore set forth, consisting of a net-work of parallel and longitudinally-extending anchor-wires C, in combination with a series of cross-timbers B, to which each of said series of wires is secured by suitable fastening devices, the ends of said wires being extended past the outer of said series of timbers to be lashed to anchorages.

2. The improved riprap and jetty construction, consisting of a net-work of wires C and a series of parallel timbers B, to which said wires are secured by means of staples 14 or equivalent devices, in combination with a series of pickets, and wires E, which connect said series of pickets with corresponding upper ends of said series of timbers, substantially as herein set forth.

3. A section of riprap and jetty work, consisting of a net-work of wires and a series of parallel timbers, to which said wires are connected by means of suitable fastening devices and the whole anchored at each end, and the second section extending parallel to the first and articulated thereto, substantially as herein set forth.

In testimony whereof I affix my signature in presence of two witnesses.

WILLIAM H. HARRELSON.

Witnesses:
H. E. PRICE,
A. A. HIGDON.